United States Patent

Hara et al.

[11] Patent Number: 5,133,067
[45] Date of Patent: Jul. 21, 1992

[54] METHOD AND APPARATUS FOR SYSTEM FOR SELECTIVELY EXTRACTING DISPLAY DATA WITHIN A SPECIFIED PROXIMITY OF A DISPLAYED CHARACTER STRING USING A RANGE TABLE

[75] Inventors: Toshitaka Hara, Seto; Kazuhiro Fujisaki, Owariasahi, both of Japan

[73] Assignee: Hitachi, Ltd., Tokyo, Japan

[21] Appl. No.: 915,407

[22] Filed: Oct. 6, 1986

[30] Foreign Application Priority Data

Oct. 9, 1985 [JP] Japan ................ 60-223522

[51] Int. Cl.⁵ ................................... G06F 15/40
[52] U.S. Cl. ..................... 395/600; 364/282.1; 364/237.2; 364/283.3; 364/974.6; 364/DIG. 2
[58] Field of Search ... 364/200 MS File, 900 MS File, 364/724, 723

[56] References Cited

U.S. PATENT DOCUMENTS

| | | | |
|---|---|---|---|
| 3,900,834 | 8/1975 | Casey et al. | 364/200 |
| 3,956,740 | 5/1976 | Jones | 364/200 |
| 4,056,821 | 11/1977 | Vittorelli | 364/900 |
| 4,057,849 | 11/1977 | Ying et al. | 364/200 |
| 4,115,850 | 9/1978 | Houston et al. | 364/200 |
| 4,125,868 | 11/1978 | Hruby | 364/900 |
| 4,327,407 | 4/1982 | Burrows | 364/200 |
| 4,365,314 | 12/1982 | Badagnani | 364/900 |
| 4,410,957 | 10/1983 | Cason | 364/900 |
| 4,429,372 | 1/1984 | Berry et al. | 364/900 |
| 4,435,778 | 3/1984 | Cason et al. | 364/900 |
| 4,464,718 | 8/1984 | Dixon et al. | 364/200 |
| 4,464,730 | 8/1984 | Lawrence et al. | 364/900 |
| 4,506,343 | 3/1985 | Shipp | 340/711 |
| 4,554,631 | 11/1985 | Reddington | 364/300 |
| 4,559,598 | 12/1985 | Goldwasser | 364/900 |
| 4,604,710 | 8/1986 | Amezcua et al. | 364/900 |
| 4,625,294 | 11/1986 | Banks | 364/900 |
| 4,677,585 | 6/1987 | Ikegami et al. | 364/900 |
| 4,692,858 | 9/1987 | Redford | 364/200 |
| 4,754,326 | 6/1988 | Kram | 364/900 |
| 4,785,413 | 11/1988 | Atsumi | 364/900 |
| 4,787,059 | 11/1988 | Yoshimura | 364/900 |
| 4,805,134 | 2/1989 | Calo | 364/900 |
| 4,807,142 | 2/1989* | Agarwal | 364/200 |
| 4,809,214 | 2/1989 | Shimakura | 364/900 |
| 4,812,966 | 3/1989 | Takagi et al. | 364/200 |

FOREIGN PATENT DOCUMENTS 57-141747 9/1982 Japan .

Primary Examiner—Thomas C. Lee
Assistant Examiner—Eric Coleman
Attorney, Agent, or Firm—Antonelli, Terry Stout & Kraus

[57] ABSTRACT

When a user of a data base desires to fetch necessary information from the data base, display the fetched information on a display unit and save a part of the data displayed on the screen of the display unit, partial data on the display screen is extracted on the basis of two kinds of tables, a character string table and a range table. The character string table is for defining a character string used as a key to search for the data on the display screen. When a character string is found on the display screen, the range table is applied to determine a data region to be extracted inclusive of this character string. The character string used as a key to search and the extracting data region which are defined in advance on the respective tables simplify the operation by the user.

13 Claims, 3 Drawing Sheets

METHOD AND APPARATUS FOR SYSTEM FOR SELECTIVELY EXTRACTING DISPLAY DATA WITHIN A SPECIFIED PROXIMITY OF A DISPLAYED CHARACTER STRING USING A RANGE TABLE

BACKGROUND OF THE INVENTION

This invention relates to a technique for partly extracting data from a display screen and more particularly to a method and apparatus for determining a desired character string and for designating regions respectively preceding and succeeding the character string to thereby extract the character string and the regions.

A data base for storing various kinds of data has been utilized extensively. The user of the data base often desires to fetch necessary information from the data base for displaying the information on the screen of a display unit and thereafter to save a part of the data displayed on the screen. However, all of the information obtained is of such a large amount that, even if it is left in hard copy or saved in another file, picking up the desired part from the filed information for later use imposes a troublesome task on the user.

As is known from Japanese Laid-Open Publication No. 57-141747, a technique has hitherto been proposed which is directed to printing out a necessary part of information displayed on a display unit. According to this proposal, a buffer memory built in the display unit and adapted to temporarily store display play contents also stores with information indicative of attributes of the buffer memory, and this attribute information is used to control whether the contents of the buffer memory should be delivered as print information to a printer. For the addition of the attribute information, however, a cursor is required to be moved on the display screen to a desired display region and hence this proposal is disadvantageous in that the number of key-in operations increases to make the intended print-out operation time excessive.

SUMMARY OF THE INVENTION

An object of this invention is to provide a method and apparatus for extracting partial data in which the operator is merely required to operate a minimum number of keys to cause a desired part of the data on the display screen to be saved with high efficiency.

To accomplish the above object, according to this invention, a part of the data on the display screen is extracted on the basis of a character string table and a range table. The character string table defines a specified character string of data displayed on the display screen. The range table sets a data region on the display screen inclusive of the specified character string. When the operator request a partial data extracting, data, being displayed on the display screen is searched using the character string data in the character string table as a key. When a designated character string is found, a data region designated by the range table is extracted and saved.

DESCRIPTION OF THE PREFERRED EMBODIMENTS

A preferred embodiment of the invention will be described with reference to the accompanying drawings.

Figure 1:
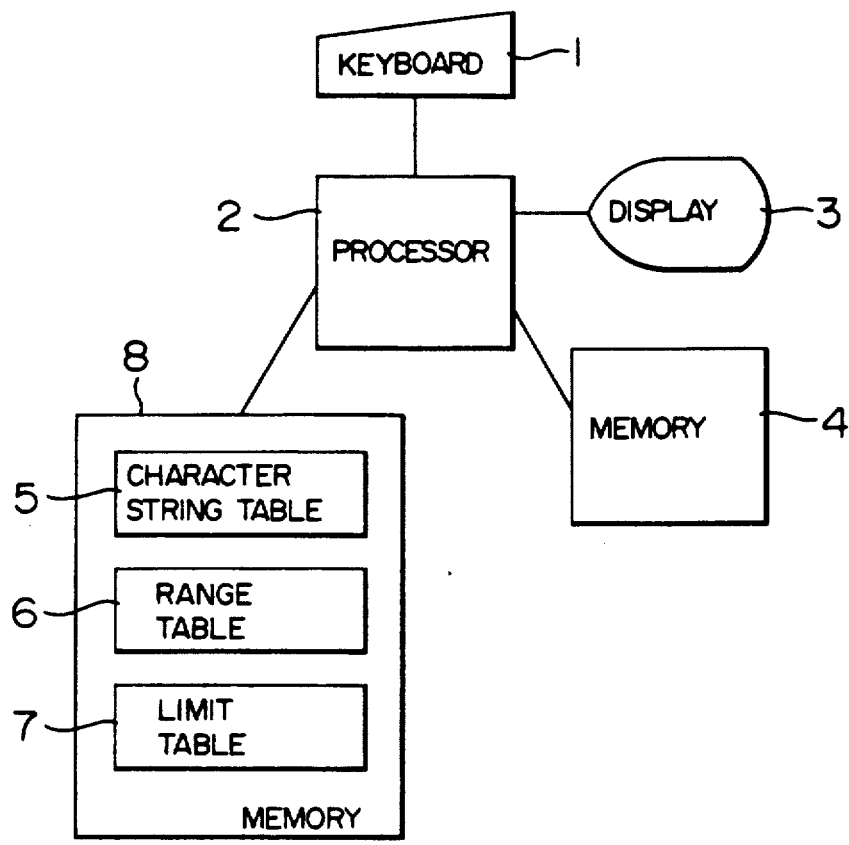
FIG. 1 is a schematic block diagram of a partial data extracting apparatus according to an embodiment of the invention.

Referring to FIG. 1, there is illustrated, in schematic block form, an apparatus for extracting a part of the data being displayed on the display screen in accordance with the invention. A keyboard 1 is used by the operator to input characters such as numerals, letters and symbols. A processor 2 is connected to the keyboard 1 and temporarily stores data keyed in from the keyboard 1. A display unit 3 is connected to the processor 2 to display the keyed-in data received from the processor 2. The display unit 3 also displays data stored in an external data base (not shown) and accessed by th eprocessor 2. The display unit 3 has by itself a refresh memory corresponding to its display screen. For the sake of extracting partial data being displayed on the display screen, the provision of a buffer corresponding to the display screen is needed. This buffer may be configured in common with the refresh memory or separately therefrom and may be installed in either the processor 2 or the display unit 3. A memory 4 is connected to the processor 2 to store a part, extracted as a desired data region, of data being displayed on the display unit 3. A memory 8 connected to the processor 2 stores three kinds of tables. Among them, a character string table 5 stores character string data used as a key when searching a desired data region, a range table 6 designates a range of the data region to be extracted, and a limit table 7 limits a range within which the character string data used as the key is searched. The limit table 7 is efficient especially when the amount of data is extremely large or when the data region to be searched is somewhat known, and it may be provided as necessary.

Figure 2:
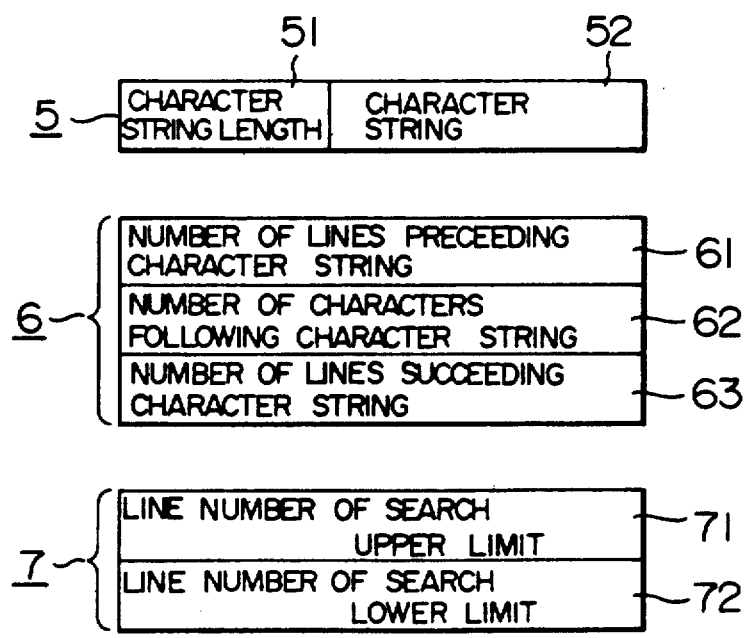
FIG. 2 illustrates formats of tables used for the invention.

FIG. 2 illustrates the contents of each of the tables. The character string table 5 is comprised of a character string 52 and a character string length 51 indicative of the length of the character string 52. The range table 6 is comprised of a field 61 indicative of the number of lines preceding a line containing a designated character string, a field 62 indicative of the number of as the designated character string and following that designated character string, and a field 63 indicative of the number of lines succeeding the line containing the designated character string. The range table 6 determines a desired data region, that is, a region to be extracted. For example, assuming that a designation is such that field 61=0, field 62=10 and field 63=0, a designated character string and a data region next to this character string containing 10 characters are determined to set up an extracting range. If field 61=2 and field 63=3 are designated, then a data region of 6 lines inclusive of the line containing a designated character string will be determined to set up an extracting range. If the field 61 is always set to be zero, there is no need of providing the field 61 in the range table 6. When characters in the field 62 terminate at the end of a line, a symbol such as "E" may be used instead of representing it by a numerical indicate a field 61 which starts from the first line on the display screen and to indicate a field 63 which ends at the last line on the display screen. The limit table 7 is comprised of a field 71 indicative of a line number corresponding to an upper limit of search for a specified character string and a field 72 indicative of a line number corresponding to a search lower limit. In the absence of the limit table 7, the entire display screen will be searched.

Figure 3:
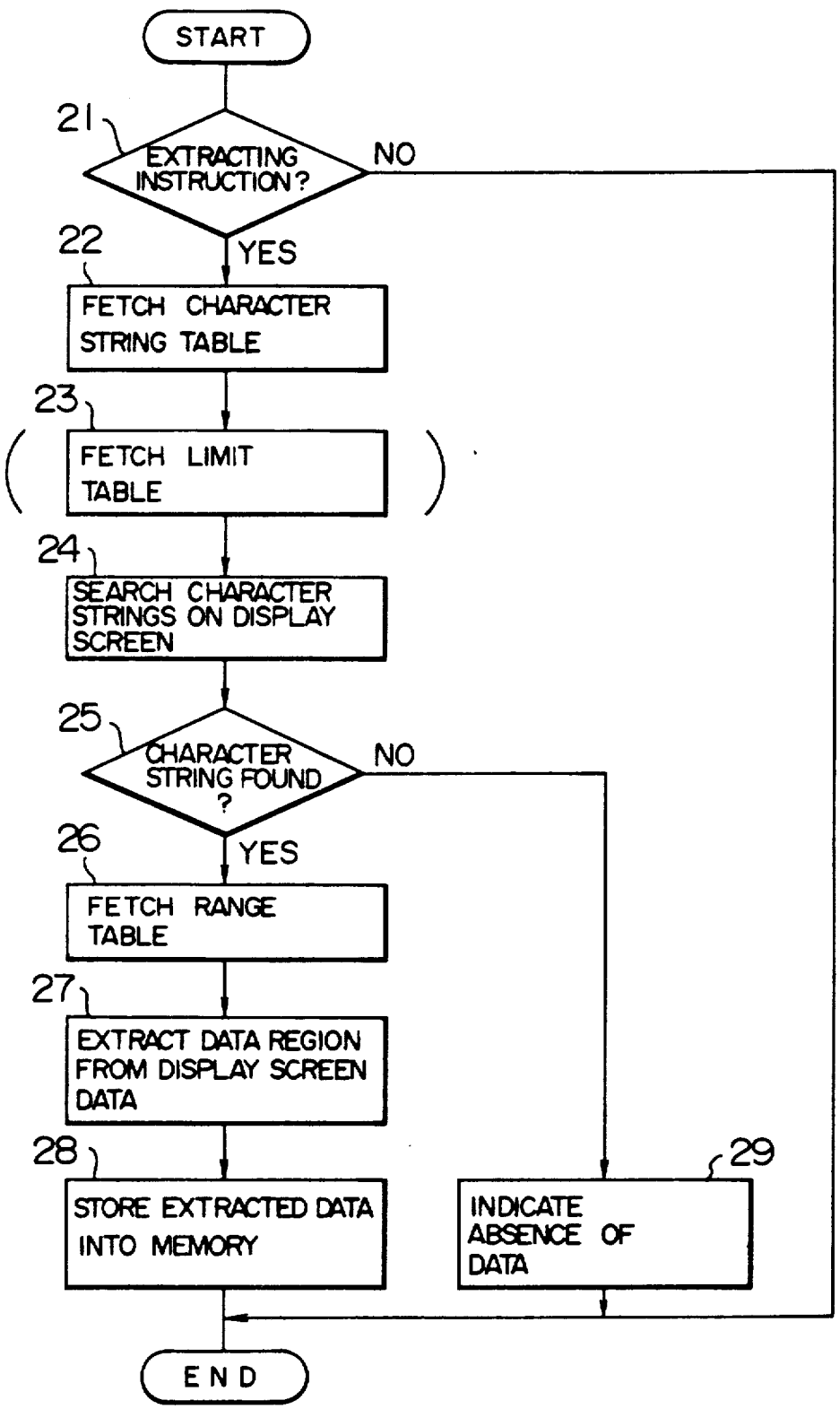
FIG. 3 is a flowchart showing the flow of processings steps.

The operation of this embodiment will be described by referring to a flowchart of FIG. 3 showing the flow of processing steps in the processor 2. Fetched display screen data resulting from accessing the external data base by the processor 2 is displayed on the display unit 3 under the control of the processor 2. A command for extracting the data displayed on the screen of the display unit 3 is sent to the processor 2 when the operator keys in the command using the keyboard 1. More particularly, the processor 2 first decides the presence or absence of an extracting instruction (step 21). In the absence of the extracting instruction, there is no necessary processing and the apparatus leaves this program. If the extracting instruction is present, the processor 2 first reads the character string table 5 out of the memory 8 and fetches a designated character string (step 22). Then, using this character string as a key, the processor 2 searches data on the display screen (step 24). Where the limit table 7 for limiting the range of search is used in searching the designated character string as described previously, the processor 2 fetches the limit table 7 (step 23) and makes a search for the character string within a limited range indicated by this table (step 24). When the designated character string is found (YES in step 25), the processor 2 fetches the range table 6 (step 26), extracts a data region indicated by this table 6 (step 27), and stores the extracted data region into the memory 4 found (NO in step 25), the absence of data is indicated (step 29) and the program ends.

Figure 4:
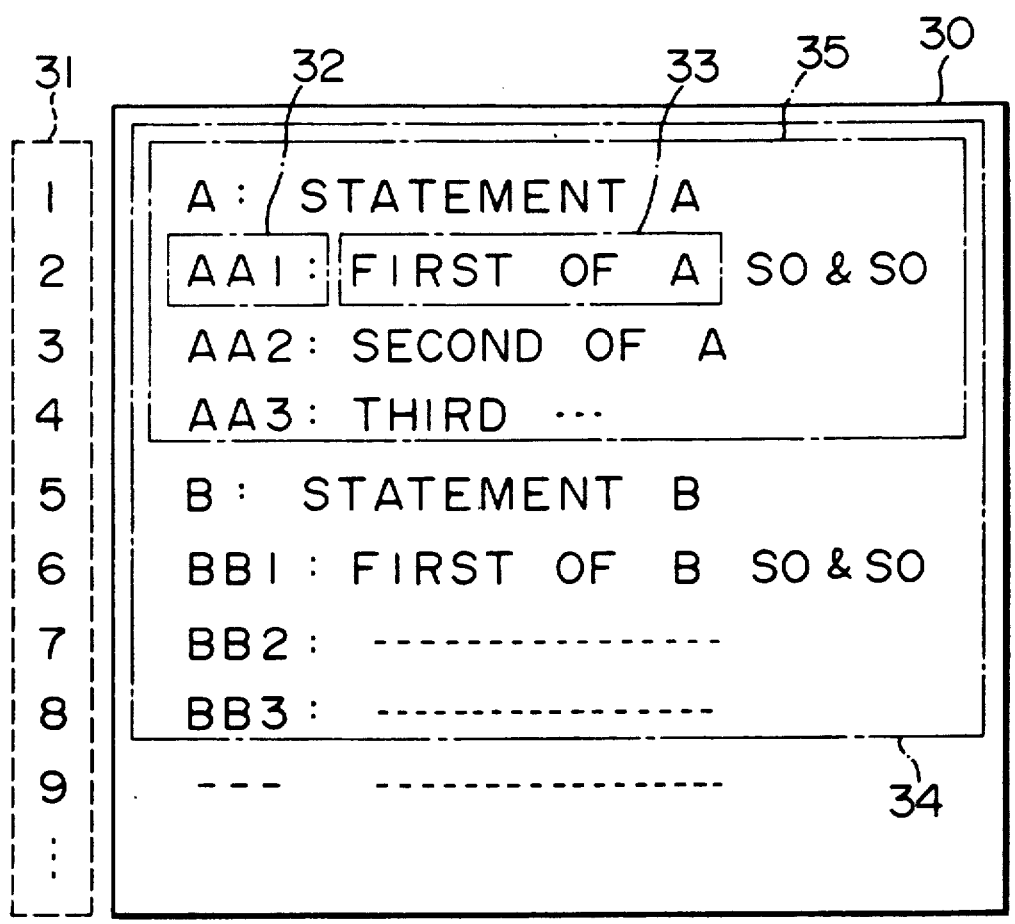
FIG. 4 is a diagram showing an example of data on the display screen and a part thereof to be extracted.

Data on the display screen and a part thereof to extracted are exemplified in FIG. 4. The entirety of the display screen of display unit 3 is denoted by reference numeral 30. Numbers allotted to respective lines on the display screen are collectively denoted by reference numeral 31. Assuming that a designated character string is "AA1:", this character string is present on the second line and corresponds to a part indicative of data 32. Under this designation of a character string, when field 61=0, field 62=10 and field 63=0 are designated in the range table 6, the data 32 and data 33 having contents of "FIRST OF A" are extracted. When field 61=1 and field 63=2 are designated data 35 is extracted. If the limit table 7 is used to designate field 71=8 and field 72=1, a range of search for character string which covers data 34 substitutes for the entire display screen.

As described above, according to this invention, since only partial data falling within a data region designated by a character string used as a key can be extracted when extracting part of data on the display screen, utilization of only a desired part of various kinds of data bases can be ensured and the amount of data produced from retrieval of the data base can be minimized.

I claim:

1. A method for extracting a part of data, which has been fetched from a data base and displayed on a display screen, on the basis of a character string table defining a specified character string of the data being displayed on said display screen and a range table defining a data region inclusive of said character string on said display screen, said method comprising the steps of:
(a) displaying said data, including said character string which is unformattedly imbedded in said data, on said display screen,
(b) inputting a command specifying said character string in said character string table by an operator;
(c) searching said data being displayed on said display screen for said character string in response to said command using said character string as a key; and
(d) extracting data in a data region defined in said range table including said character string as designated in said character string table and storing said extracted data in a memory device.

2. An extracting method according to claim 1 wherein said range table has a field indicative of a number of display lines succeeding a display containing said character string.

3. An extracting method according to claim 1 wherein said range table has a field indicative of a number of display lines preceding a display line containing said character string and a field indicative of a number of display lines succeeding said display line containing said character string.

4. An extracting method according to claim 1 wherein said range table defines a number of characters within said data region contained in the same display line as said character string and following said character string.

5. An extracting method according to claim 1 wherein said step of searching said data using said character string as a key is performed on the basis of a table for limiting a range of search for said character string to a region which is smaller than said display screen.

6. An apparatus for extracting a part of data being displayed on a display screen, comprising:
display means for displaying said data, including a character string which is unformattedly imbedded in said data, on said display screen;
first memory means having a character string table defining a specified character string in said data being displayed on said display screen and a range table defining a data region inclusive of said character string on said display screen;
second memory means for storing data in a data region when it is extracted;
input means through which an operator inputs a command specifying said character string in said character string table; and
processor means connected to said display means, said first memory means, said second memory means and said input means for reading said specified character string and a data region identification from said character string table and said range table, respectively, when said command is inputted through said input means, for searching for said character string which is imbedded in said data in a buffer corresponding to said display screen sign said character string as a key and for extracting and for storing data in said data region into said second memory means.

7. An extracting apparatus according to claim 6 wherein said range table has a field indicative of a number of display lines succeeding a display line containing said character string.

8. An extracting apparatus according to claim 6 wherein said range table has a field indicative of a number of display lines preceding a display line containing said character string and a field indicative of a number of display lines succeeding said line containing said character string.

9. An extracting apparatus according to claim 6 wherein said range table defines a number of characters following said character string in the same display line as said character string.

10. An extracting apparatus according to claim 6 wherein said first memory further includes a table for limiting a range of search for said character string to a region which is smaller than said display screen.

11. An extracting apparatus according to claim 6 wherein said input means is a keyboard.

12. A method of extracting a part of data, which has been fetched from a data base and displayed on a display screen, on the basis of a character string table defining a specified character string of the data being displayed on said display screen and a range table defining a data region inclusive of said character string on said display screen, said method comprising the steps of:

(a) storing in said character string table at least one character string;
(b) storing in said range table information which specified at least one of a display line of data preceding and a display line of data following a display line of data including a specified character string;
(c) displaying data including a specified character string which is unformattedly imbedded in said data, on said display screen;
(d) inputting a command specifying a character string in said character string table by an operator;
(e) searching said data being displayed on said display screen for the specified character string in response to said command using said specified character string as a key;
(f) extracting data in a data region including a display line in which said specified character string is included and at least one of a display line preceding and a display line following the display line in which said specified character string is included, as defined in said range table; and
(g) storing the extracted data in a memory device.

13. An apparatus for extracting a part of data being displayed on a display screen, comprising:

displaying means for displaying said data, including a character string which is unformattedly imbedded in said data, on said display screen;
first memory means having a character string table defining a specified character string in said data being displayed on said display screen and a range table defining a data region of at least one of a display line preceding and a display line succeeding a character string on said display screen;
second memory means for storing data in a data region when it is extracted;
input means through which an operator inputs a command specifying said character string in said character string table; and
processor means connected to said display means, said first memory means, said second memory means and said input means for reading said specified character string and said data defined in said range table as at least one of a display line preceding and a display line succeeding said specified character string from said character string table and said range table, respectively, when said command is inputted through said input means, for searching for said character string which is imbedded in said data in a buffer corresponding to said display screen using said character string as a key and for extracting and storing data in said data region into said second memory means.

* * * * *